United States Patent
Covarrubias

(10) Patent No.: US 7,572,095 B2
(45) Date of Patent: Aug. 11, 2009

(54) AUTOMATIC TRAY FEEDER

(75) Inventor: Noe Santana Covarrubias, Jalisco (MX)

(73) Assignee: Grupo Bimbo, S.A.B. de C.V., Mexico City (MX)

(*) Notice: Subject to any disclaimer, the term of this patent is extended or adjusted under 35 U.S.C. 154(b) by 125 days.

(21) Appl. No.: 11/512,076

(22) Filed: Aug. 29, 2006

(65) Prior Publication Data
US 2007/0104564 A1   May 10, 2007

(30) Foreign Application Priority Data
Aug. 30, 2005   (MX) ............... PA/A/2005/009226

(51) Int. Cl.
*B65H 3/08* (2006.01)
*B65G 59/04* (2006.01)

(52) U.S. Cl. ..................... 414/797; 221/211

(58) Field of Classification Search .............. 221/193, 221/210, 211; 414/795.6, 796.9, 797
See application file for complete search history.

(56) References Cited

U.S. PATENT DOCUMENTS

| | | | | |
|---|---|---|---|---|
| 2,397,297 A | * | 3/1946 | Sonnenberg | 53/281 |
| 2,653,743 A | * | 9/1953 | Stenger | 53/250 |
| 2,836,328 A | * | 5/1958 | Kinney | 221/211 |
| 4,674,935 A | * | 6/1987 | Feliks et al. | 414/797.8 |
| 5,529,210 A | * | 6/1996 | Cooper, III | 221/211 |

* cited by examiner

*Primary Examiner*—Gregory W Adams
(74) *Attorney, Agent, or Firm*—Fish & Richardson P.C.

(57) ABSTRACT

An automated feeder may allow continuous and synchronized feeding of small trays to equipment for subsequent processing. Automated feeder includes a piston with a suction cup on a distal end. The suction cup may contact and extract via a vacuum trays disposed in a compartment disposed in front of the piston. The compartment may include a frame with rods projecting perpendicularly and at least one backstop to inhibit movement of the trays. A vacuum breaking means may be disposed between the piston and the frame, such that during extension of the piston a vacuum is generated to hold a tray. When the piston is retracted, the tray is pulled from the compartment, partially deforming corners of the tray which releases the tray from backstop(s) of the frame. The small tray falls down by gravity and is taken by a ramp to a conveyor to equipment for subsequent processing.

11 Claims, 3 Drawing Sheets

AUTOMATIC TRAY FEEDER

CLAIM OF PRIORITY

This application claims priority under 35 USC §119(a), to Mexican Patent Application Ser. No. PA/a/2005/009226, filed on Aug. 30, 2005, the entire contents of which are hereby incorporated by reference.

TECHNICAL FIELD

The present invention relates to the management and the handling of bakery products, more specifically, to an automatic feeder.

BACKGROUND

Currently, there are several machines that feed and dose small boxes or trays (e.g. "capacillos" or small trays or dishes), of different configurations or shapes, continuously to the conveyors of bakery product wrapping machines. For example, machines may dose rectangular shape boxes that are stacked and compacted using plier elements and mechanisms. Rectangular shaped boxes have points of support that allow the separation of the boxes, on an individual basis, from the pile of boxes.

Another example is a machine that includes a supporting structure with two parallel vertical plates with frames that generate a compartment where the boxes are compacted and stacked. A pair of transverse arms, with sanitary rubber insertions diametrically opposed, is arranged underneath the structure. The arms are mechanically moved and synchronized through chains, sprockets and straight gears, to make the arms spin in the opposite directions. Mechanical pressure is thus exercised simultaneously on the ends of each small box at the bottom of the stack of small boxes compressed and stacked in the supporting structure. The arms dose the boxes to the wrapping feeder that consists of chains with pushers.

These machines easily damage the small boxes and trays, affecting the final quality of the already wrapped product. Thus, the described machines and devices are not suitable for dosing small trays or dishes that are stacked and not compressed.

SUMMARY

Automatic feeding of small trays for bakery products may provide exact and precise dosing of small trays, on an individual and a continuous basis, to conveyors that lead to bakery product wrapping machines. Automatic feeders for providing small trays to a bakery product wrapper may be simple, practical, efficient, cost-effective, and have good performance. Automatic feeders for providing small trays to a bakery product wrapper may also prevent damage to the small trays or dishes during operation. Automatic feeders may provide small trays to a bakery product wrapper on a synchronized basis.

The automatic feeder of small trays to a bakery product wrapper may include a support structure. A support structure may include a piston activated by electronic valves. An end of a piston includes a suction cup. A vacuum may be generated in the suction cup to extract small trays on an individual basis. A stack of trays may be disposed in a compartment located in front of the piston. The compartment includes a frame and from one of its faces perpendicularly projects rods that form the compartment. Small trays may be stacked in the compartment without compressing the trays. The frame includes at least one backstop to hold or limit the movement of the stacked trays. A means for breaking the vacuum in the suction cup is arranged between the piston and the frame. When the piston is extended, a vacuum is generated in the suction cup sufficient to hold the tray. When the piston is retracted, the suction cup extracts the tray from the compartment by partially deforming the tray. Breaking the vacuum in the suction cup releases the tray so that the tray falls by gravity onto a ramp that provides the tray to a conveyor for subsequent processing. The process may be synchronized with the wrapper conveyor; thus, depositing the small trays on an individual and a continuous basis to the conveyor.

The vacuum breaking means, in one of its modes, includes a support plate that in turn is coupled to the support structure. In some implementations, the support plate that holds the vacuum breaking means is coupled to the frame of the compartment where the small trays are disposed. The vacuum breaking means may include a plate transverse to the longitudinal axis of the piston which may restrict the movement of the small trays, and/or may include a predetermined opening sized to allow the suction cup to pass through the opening but inhibit the small trays from passing through the opening.

The support structure, together with or separately from the compartment, is by means of supports disposed over the conveyor that directs trays to the conveyor or to another appropriate means, which allows the supporting structure to maintain a proximity, a position and a distance ratio to the conveyor that transports the small trays for subsequent processing. The automatic feeder, as a whole, may be disposed vertically or at an angle over and/or in relation to the conveyor, to allow gravity to move the stack of small trays to the frame and place small trays in position to be released and dosed to the conveyor.

The details of one or more implementations are set forth in the accompanying drawings and description below. Other features and objects will become apparent from the description, the drawings and from the claims.

DETAILED DESCRIPTION OF THE INVENTION

Figure 1:
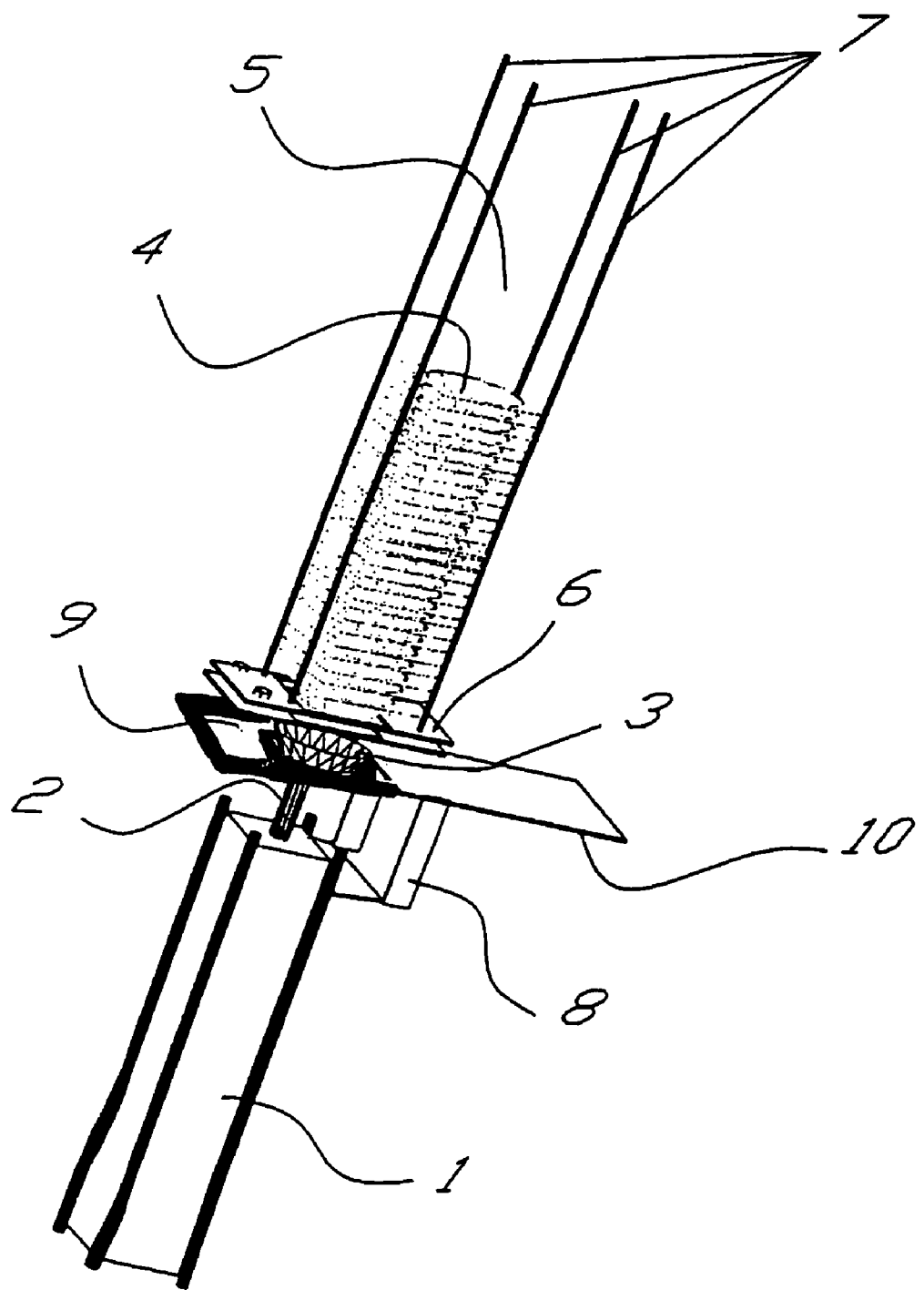
FIG. 1 is a perspective view that illustrates an example of an automatic feeder for small trays.

FIG. 1 illustrates an example automatic feeder for continuously providing small trays to a bakery product wrapper. The automatic feeder includes a support structure 1 with a piston 2 that on its end includes a suction cup 3 to hold and extract small trays 4, individually. Small trays 4 may be disposed in a compartment 5 disposed over piston 2 at suction cup 3. Compartment 5 includes a frame 6. Frame 6 includes rods 7 that project perpendicularly. Rods 7 delimit compartment 5, in which small trays 4 are stacked but not compressed. A support projection 8 is fastened to supporting structure 1 of piston 2, which supports a top plate, 9 transverse to piston 2, as a means of breaking the vacuum in suction cup 3. Top plate 9 includes an opening of predetermined size through which suction cup 3 may pass; but that inhibits small trays 4 from passing through. When the suction cup 3 holds small tray 4 using a vacuum produced by a vacuum generating means and the small tray hits the top plate 9, the vacuum breaks in the suction cup, releasing the small tray.

Frame 6 includes in each corner a backstop (shown in FIG. 1) that limits the movement of the stack of small trays 4. When piston 2 is extended, suction cup 3 generates a vacuum to hold a small tray 4. In the reverse stroke of the piston, the ends of the small tray are partially deformed and the tray is released from the backstops of the frame. When small tray 4 hits top plate 9, which is transverse to the piston 2, the vacuum in suction cup 3 breaks and the small tray is released. The small tray 4 then falls down by gravity and is taken via a ramp 10 to the conveyor for subsequent processing.

Figure 2:
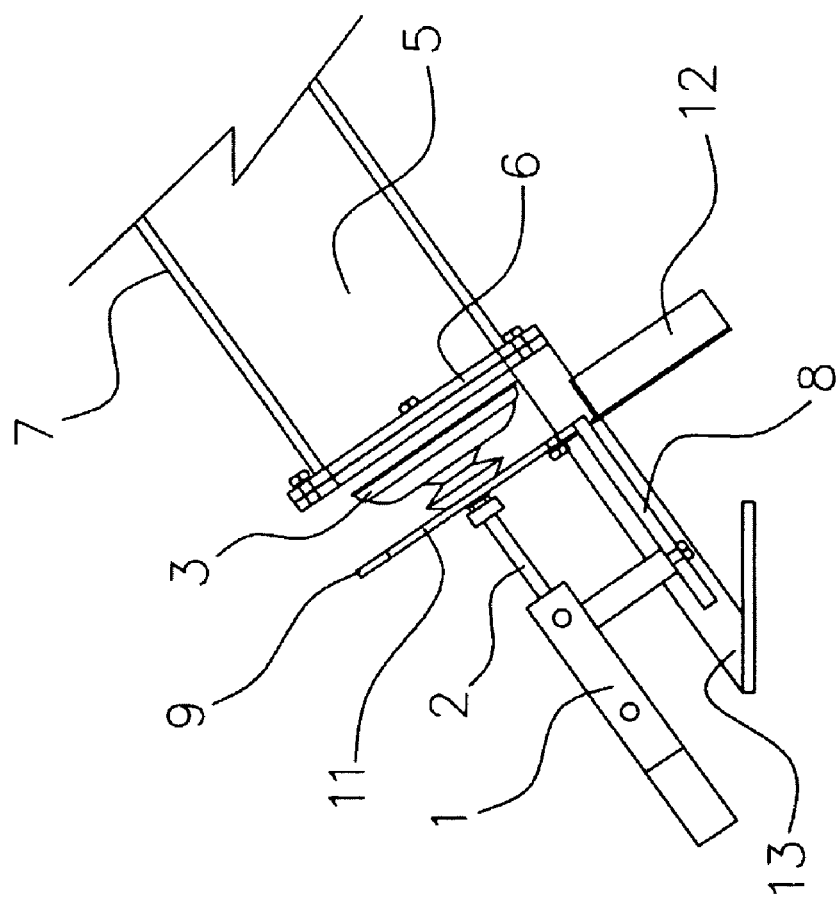
FIG. 2 is an enlarged partial side view of a portion of the feeder of FIG. 1.

FIG. 2 illustrates a side view of a portion of an example automatic feeder. Piston 2 is coupled on an end to supporting means 1 and includes suction valve 3. Suction cup 3 holds and extracts small trays (showed in FIG. 1) from compartment 5, which is delimited by containment rods 7. Support 8 is coupled to supporting structure 1 and is arranged parallel to piston 2. Support 8 supports top plate 9 that is disposed between frame 6 and piston 2 and is disposed in a cross direction to the piston's stroke.

Top plate 9 includes an opening 11 of a predetermined size through which suction cup 3 can freely pass. When suction cup 3 holds a tray, the tray hits top plate 9 breaking the vacuum of the suction cup and releasing the small tray. The small tray then falls to a ramp 12 that transports the small tray to the conveyor of the product wrapper (not shown).

Support 13 is coupled to frame 6 which supports, the automated feeder and ramp 12. Support 13 may position automatic feeder at an angle. For example, automatic feeder may be disposed at an angle of 35° from horizontal, which allows trays to fall, by gravity, from compartment 5 to frame 6, where the trays are extracted by suction cup 3.

Figure 3:
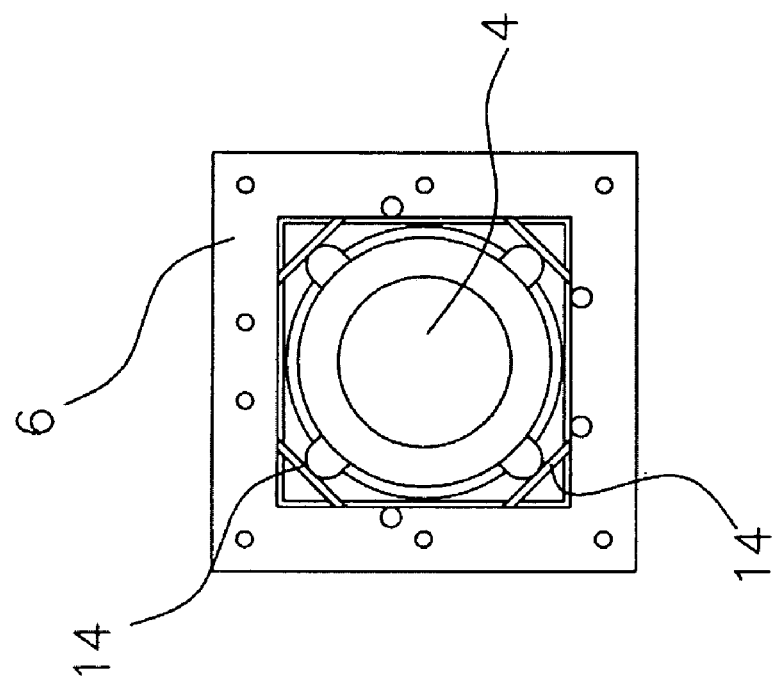
FIG. 3 is a bottom cross-sectional view illustrating the automatic feeder of FIG. 2.

FIG. 3 illustrates a bottom view of compartment 5. Frame 6 includes, on each corner, a backstop 14 that limits movement and/or inhibits a stack of small trays 4 from falling. Small trays 4 may have a square shape with a central circular concavity, such that the corners of the square section of the tray hit backstop 14 and when the tray is pulled out of the compartment by the suction cup (not showed) the corners of the trays are deformed, which releases the tray from backstop 14. Backstop 14 may be diagonal rods that make a triangle on each corner.

Figure 4:
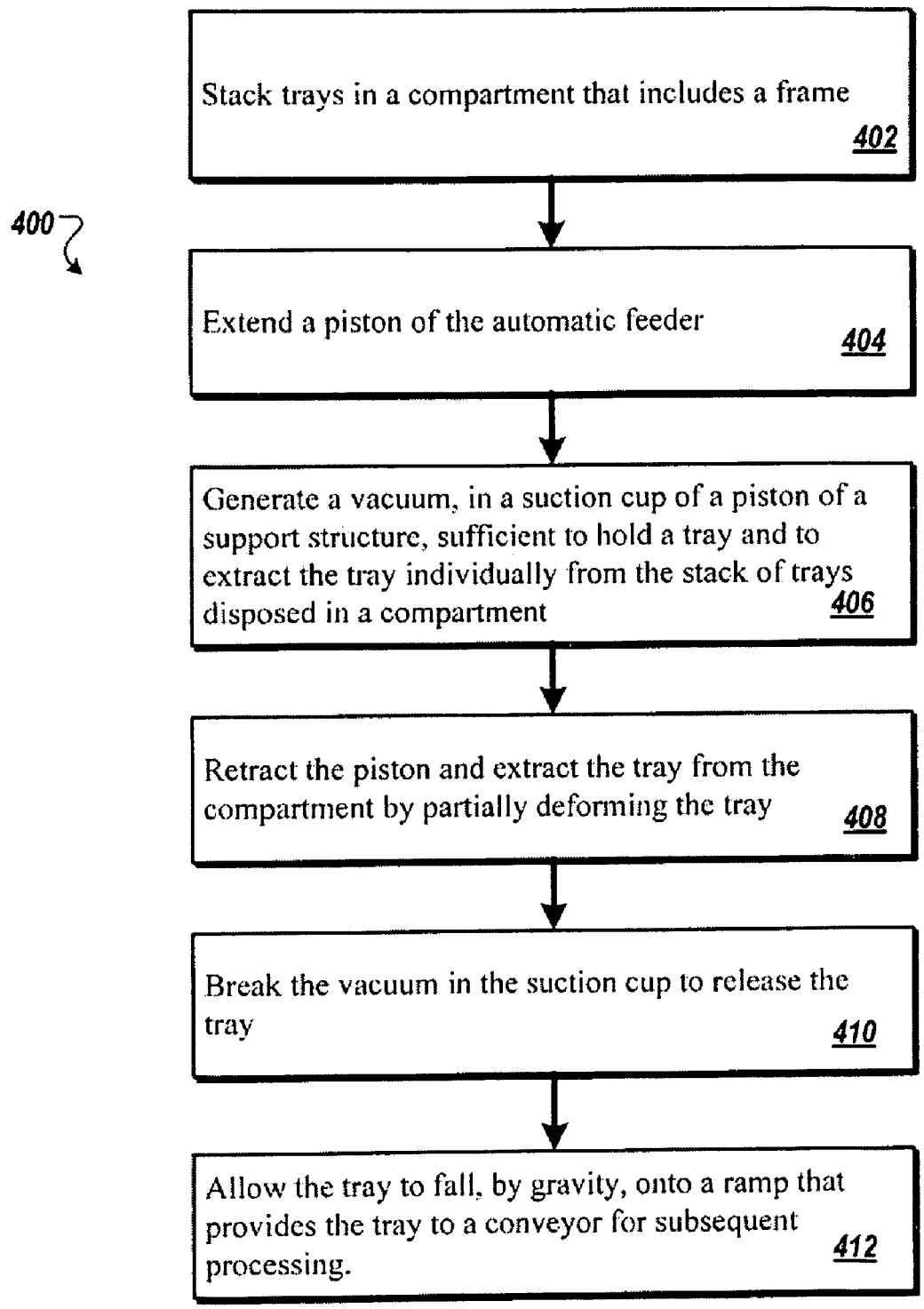
FIG. 4 is a flowchart illustrating an example use of an automatic feeder.

FIG. 4 is a flowchart illustrating an example process 400 of use of an automatic feeder. Stack trays in a compartment that includes a frame (operation 402). Extend a piston of the automatic feeder (operation 404). Generate a vacuum, in a suction cup of a piston of a support structure, sufficient to hold a tray and to extract the tray individually from the stack of trays disposed in a compartment (operation 406). Retract the piston and extract the tray from the compartment by partially deforming the tray (operation 408). Break the vacuum in the suction cup to release the tray (operation 410). Allow the tray to fall, by gravity, onto a ramp that provides the tray to a conveyor for subsequent processing (operation 412).

A number of implementations have been described. Nevertheless, it will be understood that modifications may be made. Accordingly, other implementations are within the scope of the application.

The invention claimed is:

1. An automatic feeder of deformable trays comprising:
 a ramp for directing one or more deformable trays away from the automatic feeder toward subsequent processing equipment;
 a piston;
 a suction cup disposed on a distal end of the piston, wherein the suction cup is adapted to hold a single deformable tray for bakery products when a vacuum is generated in the suction cup;
 a compartment comprising:
  a frame adapted to support a stack of a plurality of nested deformable trays, the trays having a bottom surface oriented towards a lower end of the compartment and an interior surface oriented towards an upper end of the compartment;
  an opening of a predetermined size to allow the bottom surface of a deformable tray to pass through the opening while maintaining the stack within the compartment and the predetermined size of the opening is sufficient to allow a single deformable tray to be separated and removed from the stack by deformation of the single deformable tray during pulling by the suction cup; and
 a stop plate disposed transverse to a longitudinal axis of the piston, the stop plate including an opening of predetermined size being sufficiently large to allow the suction cup to pass from below though the opening and contact the bottom surface of a single deformable tray and being sufficiently small to prevent the single deformable tray from passing through the opening;
 a vacuum source for generating a predetermined vacuum in the suction cup when the piston is extended, and wherein the predetermined vacuum is sufficient for the suction cup to hold the single deformable tray for bakery products when the suction cup contacts the bottom surface of the single deformable tray, and wherein a portion of the single deformable tray at least partially deforms when the piston is retracted, thereby allowing the single deformable tray contacted by the suction cup to pass through the opening in the frame, and wherein when the single deformable tray contacts the stop plate, the vacuum in the suction cup is broken and the single deformable tray is released from the suction cup allowing the single deformable tray to fall to the ramp.

2. The automatic feeder of claim 1 wherein the stop plate is coupled to the frame of the compartment.

3. The automatic feeder of claim 1 further comprising a support plate coupled to the stop plate and the piston.

4. The automatic feeder of claim 1 wherein the automatic feeder further includes a conveyor disposed below the ramp.

5. The automatic feeder of claim 1 wherein the frame is rectilinear and includes a backstop disposed in each corner of the frame, said backstop adapted to form the opening in the frame.

6. The automatic feeder of claim 1 wherein the automatic feeder is disposed at an angle from horizontal.

7. The automatic feeder of claim 1 wherein the automatic feeder is disposed at approximately 35 degrees from horizontal.

8. The automatic feeder of claim 1 further comprising rods projecting perpendicularly from the frame, wherein the rods are adapted to hold the plurality of trays in the compartment.

9. A method of automatically feeding deformable trays to equipment for subsequent processing comprising:
 providing a plurality of deformable trays in a compartment of an automatic feeder, wherein the compartment includes a frame, and wherein the frame includes an opening of predetermined size in a bottom thereof;
 creating a predetermined vacuum in a suction cup coupled to a piston, wherein the piston is disposed below the opening in the compartment;

actuating the piston to extend the suction cup through an opening of predetermined size in a stop plate, the stop plate disposed transversely to the piston;

contacting the suction cup with a lowermost single deformable tray of the plurality of deformable trays in the compartment with the suction cup;

holding the single deformable tray via the predetermined vacuum in the suction cup;

deforming the single tray held by the suction cup by pulling the single deformable tray through the predetermined opening in the frame and thereby releasing the tray from the compartment; and contacting the single deformable tray held by the suction cup with the stop plate disposed transversely to the piston to break the vacuum in the suction cup thereby releasing the single tray held by the suction cup by breaking the vacuum in the suction cup.

10. The method of claim 9 further comprising allowing the tray to fall on a ramp for directing the tray to equipment for subsequent process.

11. The method of claim 10 further comprising conveying the tray away from the feeder to subsequent equipment for processing.

* * * * *

UNITED STATES PATENT AND TRADEMARK OFFICE
CERTIFICATE OF CORRECTION

PATENT NO. : 7,572,095 B2  
APPLICATION NO. : 11/512076  
DATED : August 11, 2009  
INVENTOR(S) : Noe Santana Covarrubias It is certified that error appears in the above-identified patent and that said Letters Patent is hereby corrected as shown below:

On title page, col. 2 (Abstract), line 1, delete "automated" and insert -- automatic --, therefor.

On title page, col. 2 (Abstract), line 3, delete "Automated" and insert -- Automatic --, therefor.

In col. 2, line 62, delete "plate, 9" and insert -- plate 9, --, therefor.

In col. 3, lines 28-29, delete "automated" and insert -- automatic --, therefor.

In col. 4, line 22, delete "though" and insert -- through --, therefor.

Signed and Sealed this

Twenty-ninth Day of September, 2009

David J. Kappos  
*Director of the United States Patent and Trademark Office*